June 6, 1944.   E. C. BOOTH   2,350,582
JOINT STRUCTURE FOR METAL TUBING
Filed Sept. 27, 1943
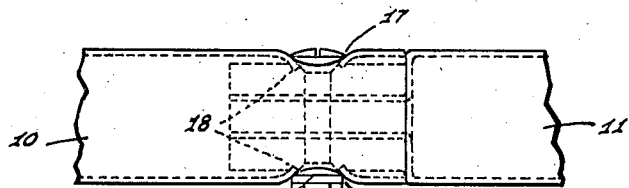
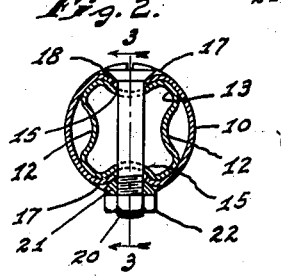 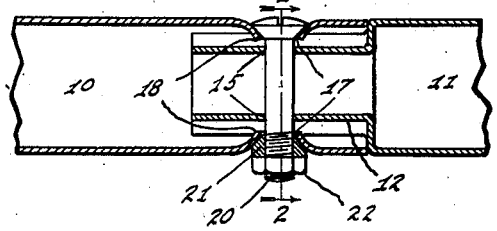
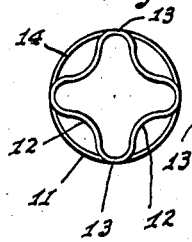 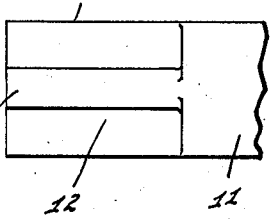 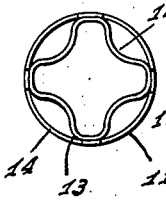 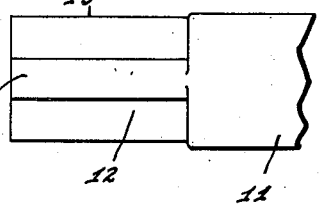
INVENTOR.
EARL C. BOOTH,
BY
ATTORNEYS.

Patented June 6, 1944

2,350,582

UNITED STATES PATENT OFFICE 2,350,582

JOINT STRUCTURE FOR METAL TUBING

Earl C. Booth, Columbus, Ind., assignor to Noblitt-Sparks Industries, Inc., Columbus, Ind., a corporation of Indiana Application September 27, 1943, Serial No. 503,939

7 Claims. (Cl. 287—119)

It is the object of my invention to interconnect two alined metal tubes of the same or nearly the same diameter in a manner which will be effective and which, at the same time, will provide a pleasing appearance.

In carrying out my invention, I provide near one end of one of the tubes a circumferential series of coplanar, arcuate slots, and I deflect the material between each slot and the adjacent end of the tube radially inwardly to form a flute. The lands left between flutes are then collapsed radially of the tube to the extent necessary to permit their insertion telescopically into the other tube. In that other tube, I provide diametrically opposite bolt holes and deflect the metal around each such bolt hole inwardly to form a frusto-conical flange of such a size and shape that it will bear against the sides of a flute on the first-named tube when the two tubes are telescopically associated. At the bottom of two diametrically opposite flutes of the first named tube, I provide a pair of bolt holes so positioned as to be alined with the bolt holes in the other tube when the two tubes are in telescopically associated position. A bolt through the alined bolt holes holds the two tubes in interconnected relationship.

The accompanying drawing illustrates my invention: Fig. 1 is a side elevation of a joint between two alined tubes; Fig. 2 is a transverse section on the line 2—2 of Fig. 3; Fig. 3 is an axial section on the line 3—3 of Fig. 2; Figs. 4 and 5 are end and side elevations of the fluted tube showing its shape after the initial forming operation; and Figs. 6 and 7 are end and side elevations of the fluted tube at the completion of the forming operations.

The drawing illustrates two tubes 10 and 11 which are of equal diameter and which are to be interconnected. One of these tubes, here shown as the tube 11, is formed at its end to provide a series of flutes 12 separated by lands 13. In the preferred method of forming the flutes 12 and lands 13, the tube-wall is sheared through at the inner end of each flute to leave between adjacent lands 13 an axially presented surface 14. Figs. 4 and 5 illustrate the end of the tube 11 at the completion of the initial forming operation.

After the tube-end has been formed as indicated in Figs. 4 and 5, it is subjected to a second forming operation in which the lands 13 are offset inwardly to an extent such that the fluted end of the tube 11 may be received within the end of the tube 10. The end of the tube 11 as thus formed is indicated in Figs. 6 and 7. To complete the end of the tube 11, alined holes 15 are provided in the bases of two diametrically opposite flutes 12.

At a distance from the end of the tube 10 equal to the distance between the holes 15 and surfaces 14 on the tube 11, the tube 10 is provided with two diametrically opposite holes 17. The material at the end of each of the holes 17 is deflected inwardly to form a frusto-conical flange 18, such flange desirably being shaped so that it will bear against the sides of one of the flutes 12 of the tube 11, in the manner illustrated in Fig. 2.

To complete the joint, a bolt 20 is passed through the alined holes 15 and 18. If desired, the bolt 20 may be of the countersunk-head type so that the head will be received within one of the frusto-conical flanges 18; and a frusto-conical washer 21, fitting the other flange 18, may be employed beneath the nut 22 of the bolt 20.

The joint illustrated in the drawing is particularly suitable for use in metal furniture of a type whose assembly requires the joining of alined tubes of the same diameter. Because of the fit of the flanges 18 within the flutes 12, the joint is effective in transmitting torsional stresses from one tube to the other. With the end of the tube 10 engaging the axially presented surfaces 14 on the tube 11, the joint is adapted to transmit axial thrusts from one tube to the other, and, in addition, possesses a smooth appearance.

I claim as my invention:

1. In combination, a metal tube provided near one end with a circumferential series of coplanar, arcuate slots, the tube metal between each slot and the adjacent tube-end being displaced radially inwardly to form a flute, the lands left between said flutes being displaced radially inwardly to an extent sufficient to permit the entry of the fluted tube-end into a tube of the same diameter, a second tube of the same diameter as the first, the fluted end of the first tube being telescopically received within the second and the end surface of the latter abutting against the sides of the slots in the former, and means for preventing axial separation of said tubes.

2. The invention set forth in claim 1 with the addition that said second tube is provided interiorly with means engaging one or more sides of the flutes on the first tube to prevent relative rotation of the two tubes.

3. In combination, a metal tube provided near one end with a circumferential series of coplanar, arcuate slots, the tube metal between each slot and the adjacent tube-end being displaced radially inwardly to form a flute, the lands left between said flutes being displaced radially inwardly to an extent sufficient to permit the entry of the fluted tube-end into a tube of the same diameter, a second tube of the same diameter as the first, the fluted end of the first tube being telescopically received within the second and the end surface of the latter abutting against the sides of the slots in the former, the telescopically associated ends of said two tubes being provided with alined holes for the reception of a transversely extending bolt, a bolt passing through said holes, the tube-metal around at least one of said holes in the second tube being displaced inwardly to engage the sides of flutes on the first tube.

4. In combination, a metal tube provided near one end with a circumferential series of coplanar, arcuate slots, the tube metal between each slot and the adjacent tube-end being displaced radially inwardly to form a flute, the lands left between said flutes being displaced radially inwardly to an extent sufficient to permit the entry of the fluted tube-end into a tube of the same diameter, a second tube of the same diameter as the first, the fluted end of the first tube being telescopically received within the second, the telescopically associated ends of said two tubes being provided with alined holes for the reception of a transversely extending bolt, a bolt passing through said holes, the tube-metal around at least one of said holes in the second tube being displaced inwardly to engage the sides of flutes on the first tube.

5. In combination, a metal tube provided near one end with a circumferential series of coplanar, arcuate slots, the tube metal between each slot and the adjacent tube-end being displaced radially inwardly to form a flute, a second tube, the fluted end of the first tube being telescopically received within the second and the end surface of the latter abutting against the sides of the slots in the former, and means for preventing axial separation of said tubes.

6. In combination, a metal tube provided near one end with a circumferential series of coplanar, arcuate slots, the tube metal between each slot and the adjacent tube-end being displaced radially inwardly to form a flute, a second tube, the fluted end of the first tube being telescopically received within the second, the telescopically associated ends of said two tubes being provided with alined holes for the reception of a transversely extending bolt, a bolt passing through said holes, the tube-metal around at least one of said holes in the second tube being displaced inwardly to engage the sides of flutes on the first tube.

7. The invention set forth in claim 5 with the addition that said second tube is provided interiorly with means engaging one or more sides of the flutes on the first tube to prevent relative rotation of the two tubes.

EARL C. BOOTH.